(12) United States Patent
Du et al.

(10) Patent No.: US 10,152,626 B2
(45) Date of Patent: *Dec. 11, 2018

(54) FINGERPRINT RECOGNITION SENSOR AND TERMINAL DEVICE (71) Applicant: SHENZHEN GOODIX TECHNOLOGY CO., LTD., Shenzhen (CN)

(72) Inventors: Canhong Du, Shenzhen (CN); Guangming Zhuo, Shenzhen (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/928,077

(22) Filed: Mar. 21, 2018

(65) Prior Publication Data
US 2018/0211083 A1 Jul. 26, 2018

Related U.S. Application Data (63) Continuation of application No. 15/246,991, filed on Aug. 25, 2016, now Pat. No. 9,965,667, which is a (Continued)

(30) Foreign Application Priority Data

Dec. 30, 2014 (CN) .......................... 2014 1 0849191

(51) Int. Cl.
G06K 9/00 (2006.01)

(52) U.S. Cl.
CPC ................................. *G06K 9/0002* (2013.01)

(58) Field of Classification Search
CPC ...... G06K 9/0002; G06F 3/044; G06F 3/0416
See application file for complete search history.

(56) References Cited

U.S. PATENT DOCUMENTS

2009/0033343 A1 2/2009 Reynolds et al.
2011/0122059 A1 5/2011 Guerrero et al.
(Continued)

FOREIGN PATENT DOCUMENTS

CN 1108827 A 9/1995
CN 1450489 A 10/2003
(Continued)

Primary Examiner — Ruiping Li (57) ABSTRACT

Disclosed is a fingerprint identification sensor, which comprises: a sensor unit, comprising a capacitor array formed by a plurality of capacitor induction units and having an output, a power supply and a sensor ground output; a conversion circuit, connected to the device ground of the terminal device, and the output and the sensor ground of the sensor unit, and configured to, upon modulating the driving signal to the modulated signal, output the modulated signal to the sensor ground; an energy storage capacitor, connected between the power supply and the sensor ground, and configured to stabilize an operating voltage of the sensor unit; a high-speed transistor switch, connected to the power supply, and configured to perform synchronous switch-on and switch-off according to status of the conversion circuit power supply; and a power supply, connected to the conversion circuit and the power supply of the sensor unit via the high-speed transistor switch.

20 Claims, 7 Drawing Sheets

Related U.S. Application Data continuation of application No. PCT/CN2015/072430, filed on Feb. 6, 2015.

(56) References Cited

U.S. PATENT DOCUMENTS

2013/0271422 A1* 10/2013 Hotelling ............... G06F 3/044
　　　　　　　　　　　　　　　　　　　　　　　345/174
2014/0218339 A1　　8/2014　Hotelling et al.

FOREIGN PATENT DOCUMENTS

| CN | 2696049 Y | 4/2005 |
|---|---|---|
| CN | 103151923 A | 6/2013 |
| CN | 103376970 A | 10/2013 |
| CN | 103679163 A | 3/2014 |
| CN | 104200221 A | 12/2014 |
| EP | 0670632 A1 * | 9/1995 |
| EP | 2650823 A2 | 10/2013 |
| WO | 2011063183 A2 | 5/2011 |

* cited by examiner

FIG. 9

FINGERPRINT RECOGNITION SENSOR AND TERMINAL DEVICE

CROSS-REFERENCE TO RELATED APPLICATIONS

This application is a continuation of U.S. patent application Ser. No. 15/246,991, filed on Aug. 25, 2016, which is a continuation of International Patent Application No. PCT/CN2015/072430, with an international filing date of Feb. 6, 2015, which is based on and claim the priority of Chinese Patent Application No. 201410849191.9, filed on Dec. 30, 2014. The contents of these specifications are incorporated herein by reference.

BACKGROUND OF THE INVENTION

Field of the Invention

The present invention relates to the technical field of fingerprint identification, and in particular, relates to a fingerprint identification sensor and a terminal device.

Description of the Related Art

The fingerprint identification technology is widely applied in the field of the electronic security, and is a reliable method for implementing identity authentication. A capacitive fingerprint identification sensor is one of the widely used fingerprint sensors, and is formed by a miniaturized capacitor polar plate array. An upper surface of the polar plate is covered by an insulation plate, and when a user puts his or her finger on the insulation plate, the skin forms the other plate of a capacitor array. Since the distances between ridges and valleys of fingerprints in different zones and the capacitance plate array are different, such that capacitance of each capacitor polar plate varies accordingly. In this way, a fingerprint image is acquired.

Figure 1:
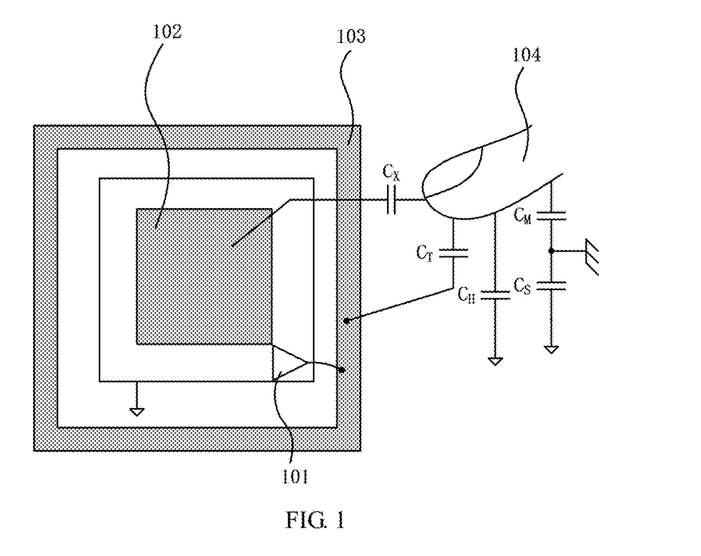
FIG. 1 is a schematic structural diagram of a fingerprint identification sensor in the related art.

FIG. 1 illustrates a common capacitive fingerprint identification sensor, which comprises a sensor unit, a driving amplifier 101, a driving metal ring 103 and a power supply (not illustrated in FIG. 1) supplying power for the sensor unit. The sensor unit comprises a capacitor array formed by a plurality of capacitor induction units 102, and FIG. 1 schematically illustrates any one of the plurality of capacitor induction units 102. The sensor unit outputs a driving signal to the driving amplifier 101, and the driving amplifier 101 amplifies the driving signal and outputs the amplified driving signal to the driving metal ring 103. When a finger 104 presses the capacitor array of the sensor unit, a coupling capacitance between the finger and the capacitor induction units 102 is $C_X$. The driving signal is coupled to the finger through a capacitance $C_T$ from the driving metal ring 103, the capacitance $C_X$ between ridges and valleys of fingerprints in different zones and the capacitor induction units 102 varies, and the capacitor induction units 102 detects that the voltage varies accordingly. In this way, the fingerprint image is acquired.

The fingerprint identification sensor having this structure needs an external metal ring 103. However, to enlarge capacitance $C_T$ as large as possible, and reduce signal attenuation, the region where the fingerprint identification sensor is located needs to be hollowed out to place the metal ring 103, such that the finger may directly touch the metal ring 103. However, in some application scenarios, for example, the appearance design of a mobile phone and a tablet personal computer, to achieve mirror-like screen effect and improve water proof performance, it is not suitable to open a hole on the screen, which restricts the application scope of the fingerprint identification sensor.

In addition, an equivalent capacitance formed by series connection of a capacitance $C_S$ and a capacitance $C_M$, in which $C_S$ is formed between a terminal device equipped with the fingerprint identification sensor and the ground, and $C_M$ is formed between the human body and the ground, and a capacitance $C_H$, formed directly between the human body and the terminal device will cause attenuation to the driving signal on the driving metal ring 103. When the terminal device is provided with a metal housing, and the device is held in one user's hand, the attenuation to the driving signal will be more serious, thereby reducing clarity of the fingerprint image, and affecting the fingerprint identification effect.

SUMMARY OF THE INVENTION

Embodiments of the present invention are intended to provide a fingerprint identification sensor and a terminal device, to broaden the application scope of the fingerprint identification sensor and improve the fingerprint identification effect.

To this end, an embodiment of the present invention provides a fingerprint identification sensor, applicable to a terminal device, wherein the fingerprint identification sensor comprises:

a sensor unit, comprising a capacitor array formed by a plurality of capacitor induction units, and having an output, a power supply and a sensor ground, the output outputting a driving signal; and a modulation circuit, connected to a device ground of the terminal device, the output, the power supply and the sensor ground of the sensor unit, and configured to, upon modulating the driving signal to a modulated signal, output the modulated signal to the sensor ground, wherein a voltage of the power supply varies with the modulated signal.

Preferably, the modulation circuit comprises:

a conversion circuit, connected to the device ground of the terminal device, the output and the sensor ground of the sensor unit, and configured to, upon modulating the driving signal to the modulated signal, output the modulated signal to the sensor ground;

an energy storage capacitor, connected between the power supply and the sensor ground, and configured to stabilize an operating voltage of the sensor unit;

a high-speed transistor switch, connected to the power supply, and configured to perform synchronous switch-on and switch-off according to status of the conversion circuit, such that a voltage of the power supply varies with the modulated signal; and a power source, connected to the conversion circuit and the power supply of the sensor unit via the high-speed transistor switch to supply power for the conversion circuit and the sensor unit.

Preferably, the sensor unit is connected to a main control module of the terminal device via a communication port, and configured to output a driving signal having a low level between modulation idle intervals, such that a level of the device ground is approximately equal to a level of the sensor ground.

Preferably, the sensor unit is directly connected to the main control module via a conducting wire, and when the conversion circuit modulates the driving signal, the communication port is maintained at a low level. Or, the fingerprint identification sensor further comprises a resistor array, the sensor unit is connected to the main control module via the resistor array. Or the fingerprint identification sensor further comprises a relay module, the sensor unit is connected to the main control module of the terminal device via the relay module.

Preferably, when the sensor unit is connected to the main control module via the relay module, the relay module receives data sent by the sensor unit and caches the data, and the main control module acquires the data from the relay module.

Preferably, the sensor unit and the relay module are integrated in a sensor chip.

Preferably, the power source is connected to the sensor unit via a power switch, ON or OFF of the power switch being controlled by the main control module or the relay module.

Preferably, the conversion circuit, the high-speed transistor switch, the power switch, and the relay module are integrated in a chip.

Preferably, the conversion circuit is formed by any one of or any combination of at least two of a transistor, an operational amplifier, a phase inverter and a digital buffer gate, plus a resistor or/and a capacitor.

Preferably, the conversion circuit is formed by two phase inverters and one resistor, the phase inverters comprising a first phase inverter and a second phase inverter; wherein a positive input power supply of the first phase inverter is connected to the power supply of the sensor unit, a negative input power supply of the first phase inverter is connected to the device ground, an input of the first phase inverter is connected to the output of the sensor unit and connected to a negative input power supply of the second phase inverter and the device ground via the resistor, and an output of the first phase inverter is connected to an input of the second phase inverter; and an positive input power supply of the second phase inverter is connected to the power source, a negative input power supply of the second phase inverter is connected to the device ground, and an output of the second phase inverter is connected to the sensor ground.

Preferably, the first inverter is formed by a first NMOS transistor, a first PMOS transistor and a first resistor; wherein a gate of the first NMOS transistor is connected to a gate of the first PMOS transistor to form the input of the first phase inverter. A source of the first PMOS transistor is used as the positive input power supply of the first phase inverter, and a source of the first NMOS transistor is used as the negative input power supply of the first inverter. A drain of the first NMOS transistor is connected to a drain of the first PMOS transistor via the first resistor, and both drains of the first NMOS transistor and the first PMOS transistor can be used as an output of the first phase inverter. The second phase inverter is formed by a second NMOS transistor, a second PMOS transistor and a second resistor, connections thereof being the same as those of the first phase inverter.

Preferably, the high-speed transistor switch is formed by any one of or any combination of at least two of a Schottky diode, a fast recovery diode, a crystal triode, a field effect transistor and a silicon controlled rectifier.

Preferably, the fingerprint identification sensor further comprises a low dropout regulator, wherein the low dropout regulator is connected between the power supply and the energy storage capacitor.

An embodiment of the present invention further provides a terminal device. The terminal device comprises a fingerprint identification sensor, wherein the fingerprint identification sensor comprises:

a sensor unit, comprising a capacitor array formed by a plurality of capacitor induction units, and having an output, a power supply and a sensor ground, the output outputting a driving signal; and a conversion circuit, connected to the device ground of the terminal device, the output and the sensor ground of the sensor unit, and configured to, upon modulating the driving signal to the modulated signal, output the modulated signal to the sensor ground;

an energy storage capacitor, connected between the power supply and the sensor ground, and configured to stabilize an operating voltage of the sensor unit;

a high-speed transistor switch, connected to the power supply, and configured to perform synchronous switch-on and switch-off according to status of the conversion circuit, such that a voltage of the power supply varies with the modulated signal; and a power source, connected to the conversion circuit and the power supply of the sensor unit via the high-speed transistor switch to supply power for the conversion circuit and the sensor unit.

In the fingerprint identification sensor according to the embodiments of the present invention, a high-speed transistor and an energy storage capacitor form a power supply circuit of a sensor unit, and a conversion circuit modulates a driving signal output by the sensor unit and then drives a sensor ground of the sensor unit. Since the driving signal of the sensor unit is modulated to a modulated signal, when a finger presses a capacitor induction unit of the sensor unit, a loop is formed for the modulated signal based on a capacitance $C_X$ between the driving signal and the finger and a capacitance between the human body and a device ground of a terminal device. When $C_X$ varies, a measurement voltage of the capacitor induction unit of the sensor unit varies accordingly, such that a fingerprint image may be acquired and fingerprint identification is implemented.

Since the fingerprint identification sensor according to the embodiments of the present invention does not need a metal ring, it is unnecessary to form a hole in the surface of a terminal device to place the driving metal ring. Therefore, the appearance design of the terminal device will not be affected, and the fingerprint identification sensor can be applied to terminal devices such as a mobile phone and a tablet personal computer not expected to be holed. Accordingly, the application scope of the fingerprint identification sensor is broadened.

In the meantime, an equivalent capacitance formed by series connection of a capacitance $C_S$ of the terminal device to the ground and a capacitance $C_M$ of the human body to the ground, and a capacitance $C_H$ of the human body directly to the terminal device would cause no attenuation impact onto the driving signal. On the contrary, the greater these capacitances are, the stronger the coupling is, the higher the voltage at two terminals of $C_X$, and the clearer the fingerprint image, which, therefore, improves the fingerprint identification effect.

The attainment of the objectives, functional features and advantages of the present invention are further described hereinafter with reference to the specific embodiments and the accompanying drawings.

DETAILED DESCRIPTION OF THE EMBODIMENTS

It should be understood that the embodiments described here are only exemplary ones for illustrating the present invention, and are not intended to limit the present invention.

The fingerprint identification sensor according to the present invention is a capacitive fingerprint identification sensor, which may be applicable to a mobile terminal, a tablet personal computer, a palm device, a smart wearable device, a multimedia player, a laptop computer, a desktop computer, and an access control security system and the like terminal device. The fingerprint identification sensor comprises a sensor unit and a modulation circuit. The sensor unit comprises a capacitor array formed by a plurality of capacitor induction units, and has an output, a power supply and a sensor ground. The output outputs a driving signal. The modulation circuit is connected to a device ground of a terminal device, and the output, the power supply and the sensor ground of the sensor unit; and configured to, upon modulating the driving signal to a modulated signal, output the modulated signal to the sensor ground, wherein a voltage of the power supply varies with the modulated signal.

Figure 2:
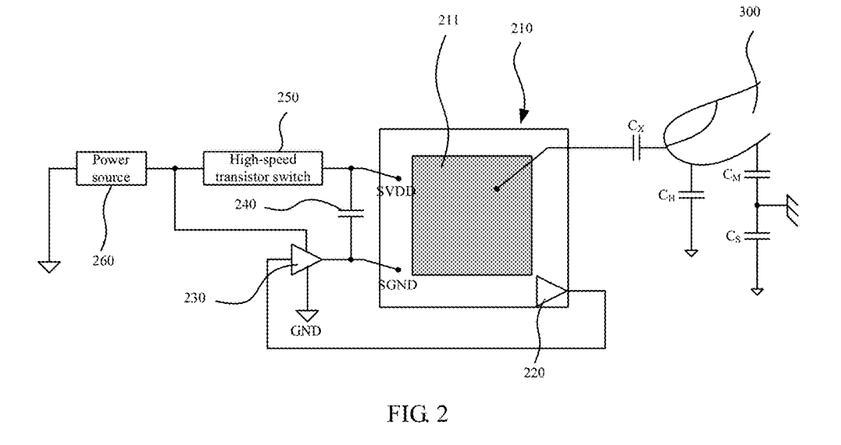
FIG. 2 is a schematic circuit structural diagram of a fingerprint identification sensor according to an embodiment of the present invention.

In an embodiment of the present invention, the fingerprint identification sensor is as illustrated in FIG. 2, and comprises a sensor unit 210 and a modulation circuit. The modulation circuit comprises: a conversion circuit 230, an energy storage capacitor 240, a high-speed transistor switch 250 and a power source 260. The sensor unit 210 has an output, a power supply (sensor VDD, hereinafter referred to as SVDD) and a sensor ground (hereinafter referred to as SGND). The output is connected to the conversion circuit 230. The conversion circuit 230 is connected to a device ground (hereinafter referred to as GND) of a terminal device and the SGND of the sensor unit. The high-speed transistor switch 250 is connected to the SVDD of the sensor unit 210, and the high-speed transistor switch 250 may be formed by any one or any combination of at least two of a Schottky diode, a fast recovery diode, a crystal triode, a field effect transistor and a silicon controlled rectifier, wherein the practice includes single formation, formation by a plurality of such components by means of series connection or/and parallel connection, and formation by a plurality of such components by means of multiple types of series connections or/and parallel connections. The power source 260 is connected to the conversion circuit 230, and is connected to the SVDD of the sensor unit 210 via the high-speed transistor switch 250, which supplies power for the conversion circuit 230 and the sensor unit 210. The energy storage capacitor 240 is connected between the SVDD and the SGND of the sensor unit 210, to stabilize the operating voltage of the sensor unit 210. The high-speed transistor switch 250 and the energy storage capacitor 240 form a power supply circuit of the sensor unit 210.

Figure 3:
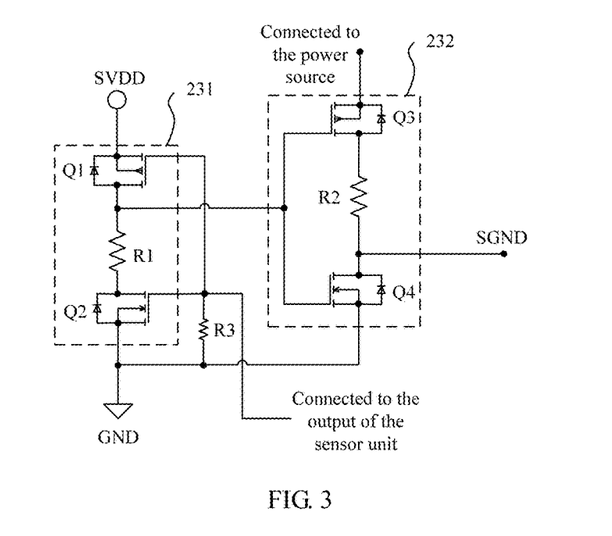
FIG. 3 is a schematic diagram illustrating circuit connection of a conversion circuit according to an embodiment of the present invention.

The conversion circuit 230 may be formed by any one or any combination of at least two of a transistor, an operational amplifier, a phase inverter, a level shifter and a digital buffer gate, plus a resistor or/and a capacitor. The conversion circuit 230 is preferably as illustrated in FIG. 3, and is formed by two phase inverters (231, 232) and a resistor R3. The two phase inverters comprise a first phase inverter 231 and a second phase inverter 232. A positive input power supply of the first phase inverter 231 is connected to the SVDD of the sensor unit 210, a negative input power supply of the first phase inverter 231 is connected to the GND of the terminal device, an input of the first phase inverter 231 is connected to the output of the sensor unit 210 and connected to a negative input power supply of the second phase inverter 232 and the GND of the terminal device via a resistor R3, and an output of the first phase inverter 231 is connected to an input of the second phase inverter 232; and an positive input power supply of the second phase inverter 232 is connected to the power source 260, a negative input power supply of the second phase inverter 232 is connected to the GND of the terminal device, and an output of the second phase inverter 232 is connected to the SGND of the sensor unit.

The phase inverter is preferably formed by two transistors and a resistor, wherein the transistor is a metal oxide semiconductor field effect transistor (hereinafter referred to as MOSFET or MOS transistor), including a positive channel metal oxide semiconductor field effect transistor (PMOSFET or PMOS transistor) and a negative channel metal oxide semiconductor field effect transistor (NMOSFET or NMOS transistor). As illustrated in FIG. 3, gates of PMOS transistors (Q1, Q3) are connected to gates of NMOS transistors (Q2, Q4) to form input of the phase inverters (231, 232), sources of the PMOS transistors (Q1, Q3) act as positive input power supply of the phase inverters (231, 232), sources of the NMOS transistors (Q2, Q4) act as negative input power supply of the phase inverters (231, 232), drains of the PMOS transistors (Q1, Q3) are connected to drains of the NMOS transistors (Q2, Q4) via resistors (R1, R2), and both the drains of the PMOS transistors (Q1, Q3) and the drains of NMOS transistors (Q2, Q4) may act as the output of the phase inverters (231, 232).

The sensor unit 210 comprises a driving amplifier 220, and a capacitor array formed of a plurality of capacitor induction units 211. FIG. 2 schematically illustrates any one of the plurality of capacitor induction units 211. An output of the driving amplifier 220, acting as the output of the sensor unit, is connected to the conversion circuit 230. The driving amplifier 220 amplifies a driving signal of the sensor unit 210 and then outputs the amplified driving signal to the conversion circuit 230. The conversion circuit 230 modulates the driving signal to a modulated signal and then outputs the modulated signal to the SGND of the sensor unit 210. The high-speed transistor switch 250 performs synchronous switch-on or switch off according to status of the conversion circuit 230, such that the voltage of the SVDD of the sensor unit 210 varies with the modulated signal.

The equivalent capacitance formed by series connection of the capacitance $C_S$ of the terminal device to the ground and the capacitance $C_M$ of the human body to the ground, and the capacitance $C_H$ of the human body directly to the terminal device would cause coupling between the human body and the GND of the terminal device. Such coupling is present in any application scenario. Since the driving signal of the sensor unit 210 is modulated to a modulated signal, when a finger presses a capacitor induction unit 211 of the sensor unit 210, a loop is formed for the modulated signal based on the capacitance $C_X$ between the modulated signal and the finger, and the capacitance between the human body and the GND of the terminal device. When $C_X$ varies, a measurement voltage of the capacitor induction unit 211 of the sensor unit 210 varies accordingly, such that a fingerprint image may be acquired.

Figure 4:
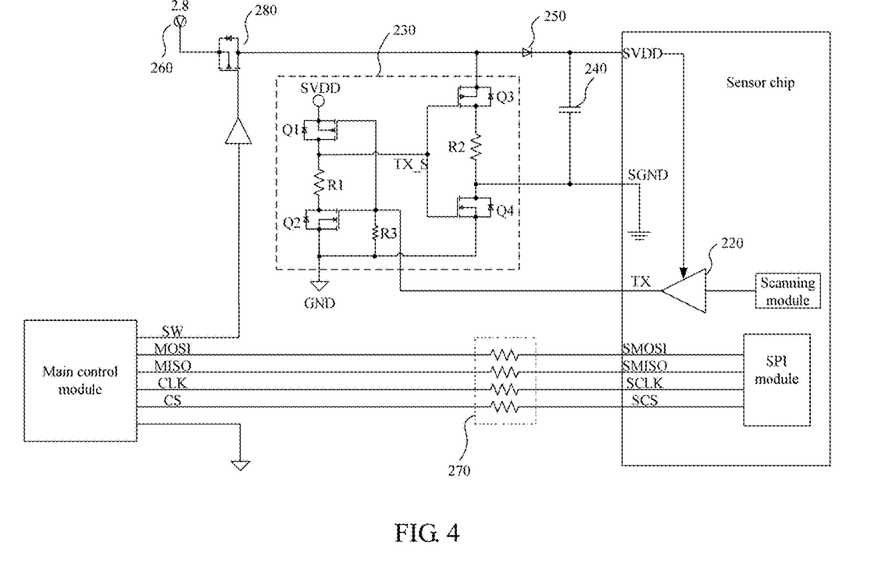
FIG. 4 is a schematic diagram illustrating circuit connection of the fingerprint identification sensor according to a first embodiment of the present invention.

FIG. 4 illustrates a first embodiment of specific application of the fingerprint identification sensor according to the present invention. In this embodiment, the sensor unit is integrated in a sensor chip, wherein the sensor chip comprises a scanning module and a serial peripheral interface (SPI) module. The scanning module outputs a driving signal to scan the capacitor array. The SPI module provides an SPI interface which acts as a communication interface of the sensor chip which is connected to a communication interface of a main control module of the terminal device, in order to communicate with the main control module via the communication interface of the main control module. For example, the sensor chip sends fingerprint image data to the main control module, and the main control module sends a control command or the like to the sensor chip. The communication interface may be an inter-integrated circuit (I2C) interface, a serial/parallel interface or the like, in addition to the SPI interface.

The conversion circuit 230, as illustrated in FIG. 3, is formed by four transistors and three resistors. The transistors may be MOS transistors, including PMOS transistors Q1 and Q3, and NMOS transistors Q2 and Q4; and the resistors include resistors R1, R2 and R3.

Figure 5:
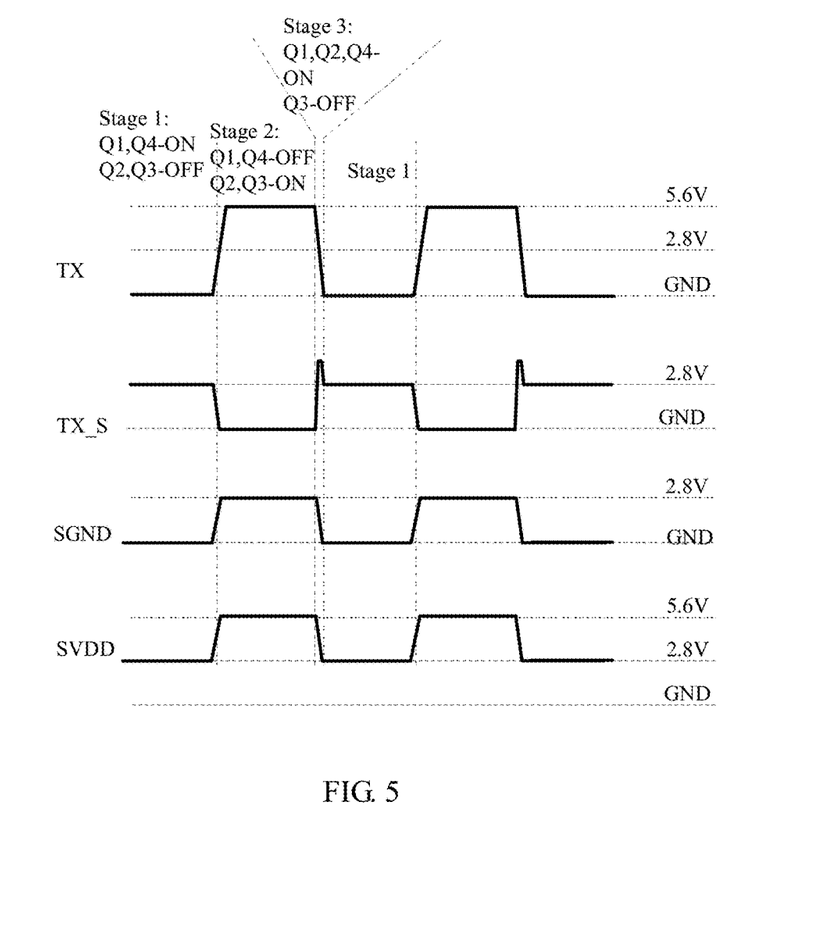
FIG. 5 is an operating time sequence diagram of the conversion circuit according to an embodiment of the present invention.

With reference to FIG. 4 and FIG. 5, the working principles of the conversion circuit are as follows:

The sensor chip scans the capacitor array and reads voltages of different capacitor induction units, and the scanning manner is controlled by scanning module. The scanning module outputs a driving signal TX, wherein the driving signal TX is a high-frequency alternating current signal, which may be specifically a sine wave, a square wave, a triangular wave or the like. In this embodiment, the driving signal TX is a wave square signal having a frequency of 800 kHz, which may also have another frequency value. The driving signal TX is modulated to the SGND via the conversion circuit 230. The peak value of the modulated signal is determined by the voltage supplied by the power source 260. In this embodiment, the peak value of the modulated signal is approximate to the input voltage 2.8 V, which may also be another voltage value.

The sensor chip outputs the driving signal TX having a low level SGND between modulation idle intervals, and a voltage difference between the driving signal TX and the SVDD is approximate to 2.8 V. The PMOS transistor Q1 is conducted, the resistance of R1 is far greater than the conductive internal resistance of the PMOS transistor Q1 and the NMOS transistor Q2. Due to existence of the resistor R1, no matter the NMOS transistor Q2 is conducted or cut off, the voltage of the node TX_S is pulled up to the SVDD, and then the SVDD voltage of the TX_S causes the NMOS transistor Q4 to be conducted and the PMOS transistor Q3 to be cut off. In this case, the NMOS transistor Q4 connects the SGND to the GND, and then causes the driving signal TX to be maintained at the GND voltage. In this way, the NMOS transistor Q2 is cut off, and the PMOS transistor Q1, the PMOS transistor Q3 and the NMOS transistor Q4 remain in unchanged status, and the voltage of the SGND is maintained at the GND, as illustrated by stage 1 in the waveforms in FIG. 5.

When the driving signal TX changes to a high level, the driving signal TX is approximately equal to the SVDD voltage. In this case, the PMOS transistor Q1 is cut off, the NMOS transistor Q2 is conducted, and the voltage of the node TX_S is pulled down to the GND; then the low voltage of the TX_S causes the PMOS transistor Q3 to be conducted, the NMOS transistor Q4 to be cut off, and in this case, the PMOS transistor Q3 forcibly pulls the SGND up to 2.8 V. Since the voltages applied at two terminals of the energy storage capacitor 240 may not be abruptly changed and are approximately maintained at 2.8 V, the SVDD voltage may be forcibly pumped to about 5.6 V, and the high-speed transistor switch 250 is automatically switched off due to reverse bias. The SVDD voltage changes to 5.6 V, and the voltage of the driving signal is approximately equal to the voltage of the SVDD. Therefore, the voltage of the driving signal TX is approximately 5.6 V, the MOS transistors Q1 to Q4 remain in unchanged status, and the SGND voltage remains stable at 2.8 V, as illustrated in stage 2 in the waveforms in FIG. 5.

When the driving signal TX changes from a high level to a low level, the voltage of the driving signal TX is approximately equal to the voltage of the SGND, about 2.8 V. In this case, the SVDD voltage is 5.6 V, the PMOS transistor Q1 and the NMOS transistor Q2 are concurrently conducted. Since the voltage of the resistor R1 and TX_S is approximately equal to the SVDD, the NMOS transistor Q4 is conducted, the PMOS transistor Q4 is cut off, and the SGND is connected to the GND. Afterwards, the process in stage 1 is repeated. The process that the driving signal TX changes from a high level to a low level is as illustrated in stage 3 in the waveforms in FIG. 5.

Described above is the operating process of the conversion circuit. The SGND of the sensor chip may be modulated to a square waveform which has the same frequency and phase as the driving signal TX, and the voltage of the modulated signal is equal to a supply voltage supplied by the power source 260.

After the sensor chip acquires fingerprint image data, the data needs to be transmitted to the main control module of the terminal device, and the main control module processes the data and identifies a fingerprint object. In this embodiment, an SPI interface is connected to the fingerprint sensor chip and the main control module, the communication interface may be practiced in a plurality of manners, which is not limited to the SPI interface according to this embodiment.

When the conversion circuit 230 modulates the SGND to an alternating current square wave signal, the signal of the SPI interface also are modulated to modulated signal. The modulated signal of the SPI interface may not be directly identified by an SPI module of the main control module, thereby resulting in communication exception. However, the sensor chip does not uninterruptedly scan the capacitor array, and different capacitor induction units may be scanned at intervals. In most cases, the interval is sufficiently large, such that the data may be transmitted directly by using the interval. Therefore, it is only required that during the scanning interval, that is, the modulation idle interval, the scanning module in the sensor chip outputs a low level driving signal, such that the level of the SGND is approximately equal to the level of the GND. In this case, the SPI module in the sensor chip is capable of normally communicating with the SPI module of the main control module.

Further, the fingerprint identification sensor further comprises a resistor array 270, and the sensor chip is connected to the main control module via the resistor array 270. The resistors in the resistor array 270 may be series resistors, pull-up and pull-down resistors, pull-up and pull-down TVS diode or the like. When the SGND of the sensor chip is modulated to an alternating current square wave, the voltage on the communication signal line may be a high voltage (in this embodiment, the voltage is 5.6 V, which is a high voltage relative to 2.8 V). This may cause latent damages to the communication interface. The resistor array 270 may avoid this problem, and the resistance of the resistor array is about 20 to 2000 ohms, as required.

In some embodiments, the resistor array 270 may be omitted, and the sensor chip is connected to the main control module directly via a conducting wire. In this case, when the conversion circuit 230 modulates the driving signal (that is, when the signal of the SGND is modulated to a square wave signal), the communication interface (for example, SPI interface in this embodiment) is maintained at a low level, and then the highest voltage on the communication signal line is only 2.8 V, thereby avoiding the above problem.

Further, the power source 260 is connected to the sensor chip via a controllable power switch 280, and the main control module controls ON or OFF (switch-on or switch-off) of the power switch 280 and hence control the power supply to the conversion circuit 230 and the sensor chip. When the sensor chip is in a modulation idle state, the power switch 280 is switched off, thereby reducing the system power consumption. In this case, when the SGND of the sensor chip is modulated to an alternating current square wave, the reset pin RST of the sensor chip is also modulated, resulting in an external reset exception. Under such circumstance, the sensor chip may be powered on again and reset by controlling the power switch 280. The power switch 280 may be formed by a crystal triode or/and a field effect transistor, which may be formed by a single one or a combination of multiples ones, for example, PMOS transistor(s).

Further, a low dropout regulator may be connected between the SVDD of the sensor chip and the energy storage capacitor, to improve stability of the power supplied for the sensor chip.

Figure 6:
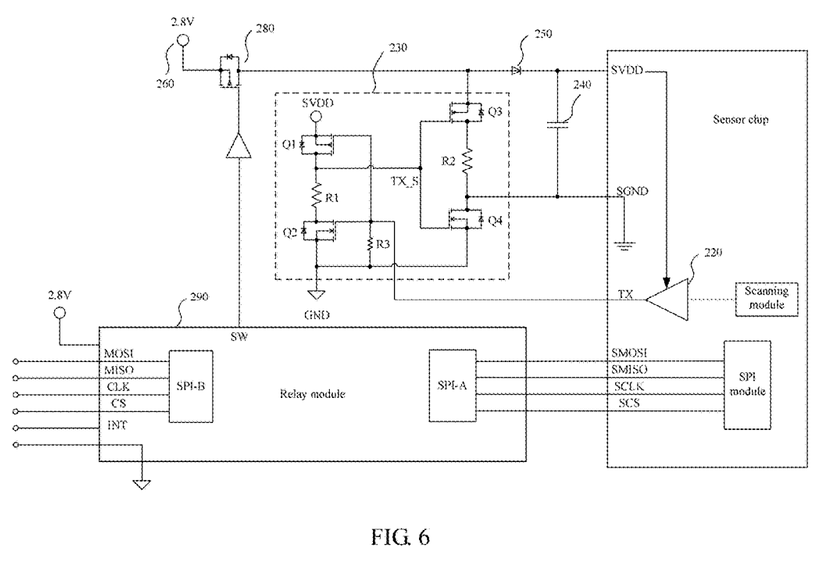
FIG. 6 is a schematic diagram illustrating circuit connection of the fingerprint identification sensor according to a second embodiment of the present invention.

FIG. 6 illustrates a second embodiment of the fingerprint identification sensor according to the present invention. This embodiment differs from the first embodiment in that the sensor chip is connected to the main control module of the terminal device via a relay module. The relay module has two SPI interfaces, SPI-A and SPI-B, wherein the SPI-A interface is connected to the SPI interface of the sensor chip, and the SPI-B interface is connected to the SPI interface of the main control module (which may also be connected via other communication interfaces). The relay module, via the SPI-A interface, receives and caches the data sent by the sensor chip, and the main control module acquires the data via the SPI-B interface of the relay module. For example, the relay module sends the data, via the SPI-B interface, to the main control module according to a command issued by the main control module. Meanwhile, the relay module further receives a command from the main control module, and controls the sensor chip according to the received command.

In the first embodiment as illustrated in FIG. 4, the main control module needs to timely receive the data of the sensor chip and process the data within the scanning interval (that is, within the modulation idle interval) of the capacitor array. However, the scanning interval may be less than 1 ms. Such a high requirement on timeliness is hard to be accommodated for most main control systems, which restricts the application scope. In this embodiment, the relay module is formed by a micro control unit (MCU), and the MCU has two groups of independent SPI communication interfaces, SPI-A and SPI-B. The MCU controls the SPI-A interface to receive the data of the sensor chip and cache the data between modulation idle intervals, and to transmit the data to the main control module via the SPI-B interface according to a command issued by the main control module when the main control module is idle, which greatly reduces the requirement on timeliness of the main control module, and improves the application scope. The MCU is further responsible for forwarding a command from the main control module to the sensor chip, and controlling the square wave signal. In addition, the relay module may be also formed by any one or any combination of at least two of an MCU, a field programmable gate array (FPGA), a flash and a first in first out (FIFO) buffer.

In the embodiment involving a relay module, the main control module or the relay module may control ON or OFF of the power switch 280.

Figure 7:
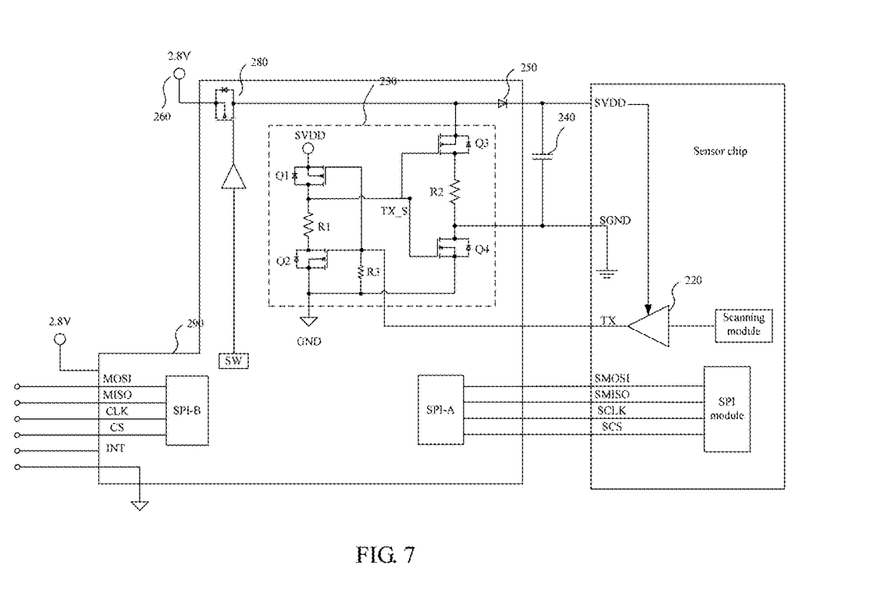
FIG. 7 is a schematic diagram illustrating circuit connection of the fingerprint identification sensor according to a third embodiment of the present invention.

FIG. 7 illustrates a third embodiment of the fingerprint identification sensor according to the present invention. This embodiment differs from the second embodiment in that the conversion circuit 230, the high-speed transistor switch 250, the power switch 280 and the relay module are integrated in the same chip, and a fingerprint identification system is mainly formed by two chips, wherein the peripheral circuits of the chips are simpler, to accommodate the demand on a small-size terminal device.

Figure 8:
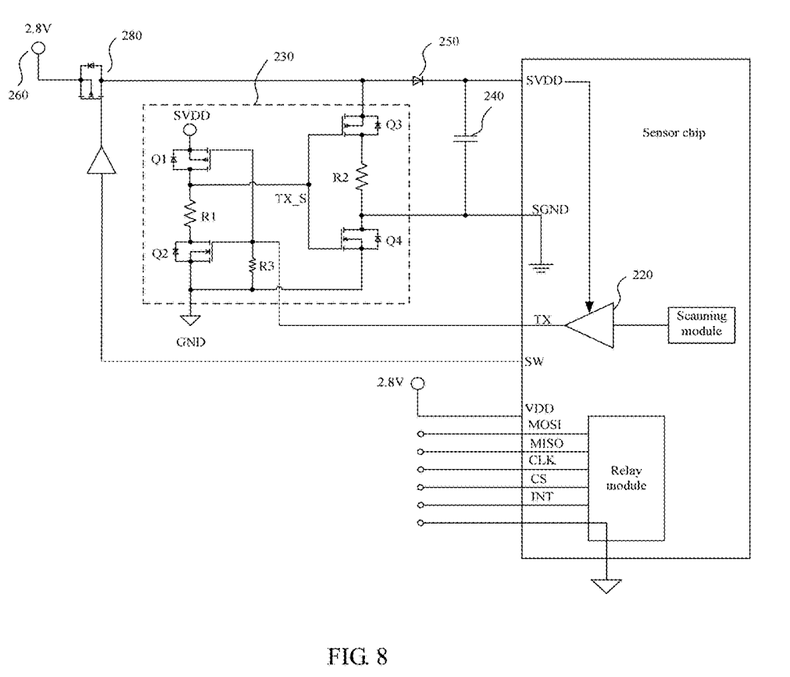
FIG. 8 is a schematic diagram illustrating circuit connection of the fingerprint identification sensor according to a fourth embodiment of the present invention.

FIG. 8 illustrates a fourth embodiment of the fingerprint identification sensor according to the present invention. In this embodiment, the sensor unit and the relay module are integrated in a sensor chip. In this way, the size of a fingerprint identification system is further reduced, to accommodate to the demand on a small-size terminal device.

Figure 9:
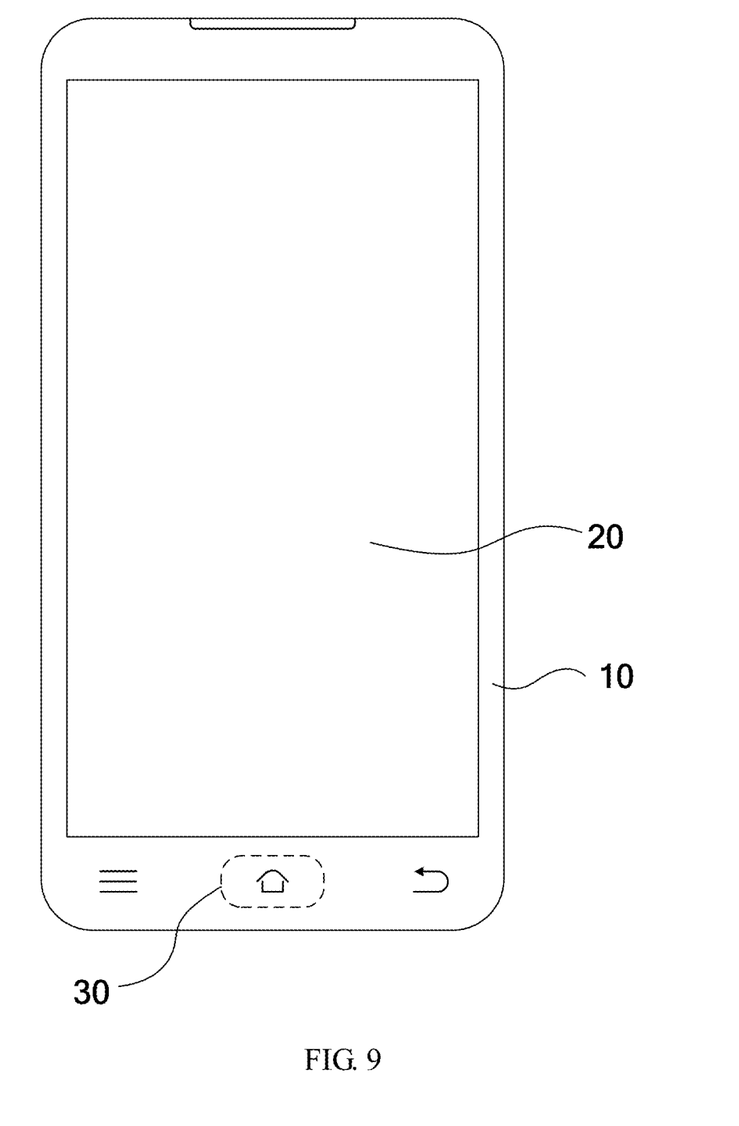
FIG. 9 is a schematic diagram illustrating application of the fingerprint identification sensor to a mobile phone according to an embodiment of the present invention.

The fingerprint identification sensor according to the embodiment of the present invention is capable of operating without a driving metal ring. Therefore, there is no need to open a hole in the surface of the terminal device, and the sensor only needs to be installed in a specific zone under an insulation plate of the device, which implements the invisible fingerprint sensor (IFS) technology. FIG. 9 illustrates an application scenario where the IFS technology is applied to a smart phone. The smart phone comprises a display screen cover plate 10, wherein a screen display region 20 is located at a central region of the screen, and a fingerprint identification sensor 30 is "hidden" under the display screen cover plate 10. A hole does not need to be opened in the display screen cover plate 10 to receive the driving metal ring. Therefore, the appearance design of the display screen cover plate 10 is not greatly affected, and a full mirror-like screen effect may be implemented.

In addition, an equivalent capacitance formed by series connection of a capacitance $C_S$ of the terminal device to the ground and a capacitance $C_M$ of the human body directly to the ground, and a capacitance $C_H$ of the human body directly to the terminal device would cause no attenuation impact onto the driving signal. On the contrary, the greater these capacitances are, the stronger the coupling is, the higher the voltage at two terminals of $C_X$, and the clearer the fingerprint image. In this way, the problem that the metal housing of the device causes attenuation to the driving signal and thus the clarity of the fingerprint signal is lowered is solved.

An embodiment of the present invention further provides a terminal device. The terminal device comprises a fingerprint identification sensor. The fingerprint identification sensor comprises: a sensor unit, a conversion circuit, an energy storage capacitor, a high-speed transistor switch and a power source. The sensor unit has an output, a power supply and a sensor ground, the output outputting a driving signal. The conversion circuit is connected to the device ground of the terminal device, the output and the sensor ground of the sensor unit, and is configured to, upon modulating the driving signal to the modulated signal, output the modulated signal to the sensor ground. The energy storage capacitor is connected between the power supply and the sensor ground, and is configured to stabilize an operating voltage of the sensor unit. The high-speed transistor switch is connected to the power supply, and is configured to perform synchronous switch-on and switch-off according to status of the conversion circuit, such that a voltage of the power supply varies with changes of the modulated signal. The power source is connected to the conversion circuit and the power supply of the sensor unit via the high-speed transistor switch to supply power for the conversion circuit and the sensor unit. The fingerprint identification sensor described in this embodiment is the fingerprint identification sensor involved in the above embodiments of the present invention, which is thus not described herein any further.

Since the terminal device according to the embodiment of the present invention employs the fingerprint identification sensor which does not need a metal ring, it is unnecessary to form a hole in the surface of a terminal device to place the driving metal ring. Therefore, the appearance design of the terminal device will not be affected. In the meantime, an equivalent capacitance formed by series connection of a capacitance $C_S$ of the terminal device to the ground and a capacitance $C_M$ of the human body directly to the ground, and a capacitance $C_H$ of the human body to the terminal device would cause no attenuation impact onto the driving signal. On the contrary, the greater these capacitances are, the stronger the coupling is, the higher the voltage at two terminals of $C_X$, and the clearer the fingerprint image, which, therefore, improves the fingerprint identification effect.

The preferred embodiments of the present invention are described with reference to the accompanying drawings, but the scope of the present invention is not limited to such embodiments. A person skilled in the art would derive various modifications or variations to practice the embodiment of the present invention without departing from the scope and essence of it. For example, the features disclosed in one embodiment may be used in another embodiment to produce a new embodiment. Any modifications, equivalent replacements and improvements made within the technical concept of the present invention shall fall within the scope defined by the claims of the present invention.

INDUSTRIAL PRACTICABILITY

In the fingerprint identification sensor according to the embodiments of the present invention, a high-speed transistor and an energy storage capacitor form a power supply circuit of a sensor unit, and a conversion circuit modulates a driving signal output by the sensor unit to drive a sensor ground of the sensor unit. Since the driving signal of the sensor unit is modulated to a modulated signal, when a finger presses a capacitive sensing unit of the sensor unit, the modulated signal is in a loop formed by a human body and a device ground of a terminal according to a capacitance $C_X$ between the driving signal and the finger. When $C_X$ varies, a measurement voltage of the capacitive sensing unit of the sensor unit varies accordingly, such that a fingerprint image may be acquired and fingerprint identification is implemented.

Since the fingerprint identification sensor according to the present invention does not need a metal ring, it is unnecessary to form a hole in the surface of a terminal device to place the driving metal ring, the appearance design of the terminal device will not be affected, and the fingerprint identification sensor can be applied to terminal devices such as a mobile phone and a tablet personal computer not expected to be holed; the application scope of the fingerprint identification sensor is broadened, and the fingerprint identification effect is improved.

In the meantime, an equivalent capacitance formed by series connection of a capacitance $C_S$ of the terminal device to the ground and a capacitance $C_M$ of the human body directly to the ground, and a capacitance $C_H$ of the human body to the terminal device would cause no attenuation impact onto the driving signal. On the contrary, the greater these capacitances are, the stronger the coupling is, the higher the voltage at two terminals of $C_X$, and the clearer the fingerprint image, which, therefore, improves the fingerprint identification effect.

What is claimed is:

1. A fingerprint identification sensor, applicable to a terminal device, comprising:

a sensor unit, comprising a plurality of capacitor induction units, an output terminal, a sensor power supply terminal and a sensor ground terminal, the output terminal being configured for outputting a driving signal; and a modulation circuit, configured to modulate the driving signal to a modulated signal, and output the modulated signal to the sensor ground terminal of the sensor unit;

wherein the modulation circuit comprises:

a conversion circuit, connected to the output terminal and the sensor ground terminal of the sensor unit, and configured to, upon modulating the driving signal to the modulated signal, output the modulated signal to the sensor ground terminal;

an energy storage capacitor, connected between the sensor power supply terminal and the sensor ground terminal, and configured to stabilize an operating voltage of the sensor unit; and a high-speed transistor switch, connected to the sensor power supply terminal, and configured to perform switch-on or switch-off under control of the conversion circuit, to cause a voltage of the sensor power supply terminal to vary with the modulated signal;

wherein a supply voltage supplied by a power source is provided to the sensor power supply terminal of the sensor unit via the high-speed transistor switch, so that the operating voltage between the power supply and the sensor ground of the sensor unit maintains at the supply voltage supplied by the power source.

2. The fingerprint identification sensor according to claim 1, wherein the power source is connected to the conversion circuit, and is connected the sensor power supply terminal of the sensor unit via the high-speed transistor switch; the power source being configured to supply power for the conversion circuit and the sensor unit.

3. The fingerprint identification sensor according to claim 2, wherein the power source is connected to the high-speed transistor switch via a power switch, and the power switch is controlled to switched-on or switched-off by a main control module of the terminal device in which the fingerprint identification sensor is included.

4. The fingerprint identification sensor according to claim 1, wherein the driving signal output by the sensor unit is an alternating current driving signal, and the modulated signal has a same frequency or phase as the driving signal; wherein a peak vale of the modulated signal is relevant to the supper voltage.

5. The fingerprint identification sensor according to claim 4, wherein the modulated signal varies in relation to a level of a device ground of the terminal device; the driving signal output by the sensor unit is in a low level at modulation idle intervals, such that a low potential of the modulated signal is approximately equal to a potential of the device ground.

6. The fingerprint identification sensor according to claim 1, wherein the conversion circuit comprises a first inverter and a second inverter;
the first inverter comprises a first NMOS transistor, a first PMOS transistor and a first resistor; wherein a gate of the first NMOS transistor is connected to a gate of the first PMOS transistor to form an input of the first inverter, a source of the first PMOS transistor serves as a positive power terminal of the first inverter, a source of the first NMOS transistor serves as a negative power terminal of the first inverter, a drain of the first NMOS transistor is connected to a drain of the first PMOS transistor via the first resistor and serves as an output of the first inverter;
the second inverter comprises a second NMOS transistor, a second PMOS transistor and a second resistor; connection of the second NMOS transistor, the second PMOS transistor and the second resistor is substantially same as that of the first NMOS transistor, the first PMOS transistor and the first resistor of the first inverter.

7. The fingerprint identification sensor according to claim 6, wherein a positive power terminal of the first inverter is connected to the sensor power supply terminal of the sensor unit, a negative power terminal of the first inverter is connected to a device ground of the terminal device, an input of the first inverter is connected to the output terminal of the sensor unit, and is further connected to a negative power terminal of the second inverter and the device ground via a third resistor, and an output of the first inverter is connected to an input of the second inverter; a positive power terminal of the second inverter is connected to the power source, a negative power terminal of the second inverter is connected to the device ground, and an output of the second inverter is connected to the sensor ground terminal of the sensor unit.

8. A terminal device, comprising a fingerprint identification sensor, wherein the fingerprint identification sensor comprises:
a sensor unit comprising a sensing array, an output terminal, a sensor power supply terminal and a sensor ground terminal; the sensing array comprising a plurality of capacitive sensing units, the output terminal being configured for outputting a driving signal; and
a modulation circuit connected to a device ground of the terminal device and the sensor unit, the modulation circuit comprising:
a conversion circuit connected to the output terminal and the sensor ground terminal of the sensor unit, the conversion circuit being configured to modulate the driving signal to generate a modulated signal, and output the modulated signal to the sensor ground terminal;
an energy storage capacitor connected between the sensor power supply terminal and the sensor ground terminal of the sensor unit, and configured to stabilize an operating voltage between the sensor power supply terminal and the sensor ground terminal of the sensor unit; and
a high-speed transistor switch connected to the sensor power supply terminal and the conversion circuit, configured to perform switch-on or switch-off under control of the conversion circuit;
wherein a power voltage is supplied to the sensor power supply terminal of the sensor unit via the high-speed transistor switch, such that a voltage of the sensor power supply terminal varies with the modulated signal, and an operating voltage between the power supply and the sensor ground of the sensor unit substantially maintains at the supply voltage.

9. A fingerprint identification sensor, comprising:
a sensor unit comprising a sensing array, an output terminal, a sensor power supply terminal and a sensor ground terminal; the sensing array comprising a plurality of capacitive sensing units, the output terminal being configured for outputting a driving signal; and
a modulation circuit comprising:
a conversion circuit connected to the output terminal and the sensor ground terminal of the sensor unit, the conversion circuit being configured to modulate the driving signal to a modulated signal, and output the modulated signal to the sensor ground terminal;
an energy storage capacitor connected between the sensor power supply terminal and the sensor ground terminal of the sensor unit; and
a switch member connected to the sensor power supply terminal and the conversion circuit;
wherein a power voltage is supplied to the sensor power supply terminal of the sensor unit via the switch member; the switch member is configured to perform switch-on or switch-off under control of the conversion circuit, such that a voltage of the sensor power supply terminal varies with the modulated signal, and an operating voltage between the power supply and the sensor ground of the sensor unit substantially maintains at the supply voltage.

10. The fingerprint identification sensor according to claim 9, further comprising a power source configured for providing the power voltage to the sensor unit, wherein the switch member is connected between the power source and the sensor power supply terminal of the sensor unit.

11. The fingerprint identification sensor according to claim 10, wherein the power source is connected to the switch member via a power switch, and the power switch is controlled to switched-on or switched-off by a main control module of a terminal device in which the fingerprint identification sensor is included.

12. The fingerprint identification sensor according to claim 9, wherein the driving signal output by the sensor unit is an alternating current driving signal, and the modulated signal has a same frequency or phase as the driving signal; wherein a peak vale of the modulated signal is relevant to the power voltage.

13. The fingerprint identification sensor according to claim 12, wherein the modulation circuit is connected to a device ground of a device in which the fingerprint identification sensor is included, and the modulated signal varies in relation to a level of the device ground.

14. The fingerprint identification sensor according to claim 13, wherein the driving signal output by the sensor unit is in a low level at modulation idle intervals, such that a low potential of the modulated signal is approximately equal to a potential of the device ground.

15. The fingerprint identification sensor according to claim 9, wherein the energy storage capacitor is configured to stabilize the operating voltage between the power supply and the sensor ground of the sensor unit.

16. The fingerprint identification sensor according to claim 15, wherein the switch member is a high-speed transistor switch comprising any one or combination of a Schottky diode, a fast recovery diode, a crystal triode, a field effect transistor and a silicon controlled rectifier.

17. The fingerprint identification sensor according to claim 16, wherein the high-speed transistor switch and the energy storage capacitor cooperatively form a power supply circuit for providing the operating voltage to the sensor unit.

18. The fingerprint identification sensor according to claim 10, wherein the conversion circuit comprises a first inverter and a second inverter; a positive power terminal of the first inverter is connected to the sensor power supply terminal of the sensor unit, a negative power terminal of the first inverter is connected to a device ground of a device in which the fingerprint identification sensor is included, an input of the first inverter is connected to the output terminal of the sensor unit, and is further connected to a negative power terminal of the second inverter and the device ground via the resistor, and an output of the first inverter is connected to an input of the second inverter; a positive power terminal of the second inverter is connected to the power source, a negative power terminal of the second inverter is connected to the device ground, and an output of the second inverter is connected to the sensor ground terminal of the sensor unit.

19. The fingerprint identification sensor according to claim 18, wherein the first inverter comprises a first NMOS transistor, a first PMOS transistor and a first resistor; wherein a gate of the first NMOS transistor is connected to a gate of the first PMOS transistor to form the input of the first inverter, a source of the first PMOS transistor serves as the positive power terminal of the first inverter, a source of the first NMOS transistor serves as the negative power terminal of the first inverter, a drain of the first NMOS transistor is connected to a drain of the first PMOS transistor via the first resistor, and the drain of the first NMOS transistor or the drain of the first PMOS transistor serves as the output of the first inverter.

20. The fingerprint identification sensor according to claim 19, wherein the second inverter comprises a second NMOS transistor, a second PMOS transistor and a second resistor; connection of the second NMOS transistor, the second PMOS transistor and the second resistor is substantially same as that of the first NMOS transistor, the first PMOS transistor and the first resistor of the first inverter.

* * * * *